United States Patent [19]

Seragnoli

[11] Patent Number: 5,642,029

[45] Date of Patent: Jun. 24, 1997

[54] CONSTANT CURRENT BATTERY CHARGER WITH AUXILIARY OUTPUT FOR PORTABLE APPARATUS

[75] Inventor: Giordano Seragnoli, Agrate Brianza, Italy

[73] Assignee: SGS-Thomson Microelectronics S.r.l., Agrate Brianza, Italy

[21] Appl. No.: 397,688

[22] Filed: Mar. 2, 1995

[30] Foreign Application Priority Data

Mar. 3, 1994 [EP] European Pat. Off. .............. 94830095

[51] Int. Cl.$^6$ .............................. H02J 7/04; H01M 10/44
[52] U.S. Cl. ............................ 320/5; 320/21; 320/39
[58] Field of Search .................... 320/5, 8, 19, 21, 320/27, 61, 55, 56, 39; 379/61

[56] References Cited

U.S. PATENT DOCUMENTS

| 4,395,639 | 7/1983 | Bring | 307/66 |
|---|---|---|---|
| 4,458,111 | 7/1984 | Sugihara | 179/2 BC |
| 5,136,229 | 8/1992 | Galvin | 320/2 |
| 5,371,456 | 12/1994 | Brainard | 320/31 |

FOREIGN PATENT DOCUMENTS

| 0523722 | 1/1993 | European Pat. Off. . |
| 2253312 | 9/1992 | United Kingdom . |
| 87-02848 | 5/1987 | WIPO . |
| 90-03059 | 3/1990 | WIPO . |

*Primary Examiner*—Peter S. Wong
*Assistant Examiner*—Patrick B. Law

[57] ABSTRACT

An auxiliary power supply line for powering the functional circuits of a portable apparatus during recharging of its internal battery by a constant current battery charger is derived from a node upstream of a sensing resistance of the current delivered to the battery under charge and is provided with isolation means.

15 Claims, 3 Drawing Sheets

CONSTANT CURRENT BATTERY CHARGER WITH AUXILIARY OUTPUT FOR PORTABLE APPARATUS

CROSS-REFERENCE TO RELATED APPLICATION

This application claims priority from EP 94830095.9, filed Mar. 3, 1994, which is hereby incorporated by reference. However, the content of the present application is not necessarily identical to that of the priority application.

BACKGROUND AND SUMMARY OF THE INVENTION

The present invention relates to a constant current battery charger system for portable apparatuses, particularly for cellular telephones, which permits a normal use of the apparatus also during recharging of its internal battery, having a simplified architecture without auxiliary power supply circuits for powering the functional circuits of the apparatus during recharging.

Many portable apparatuses and in particular cellular telephones employ rechargeable batteries for example NiCd or Al/NiCd or Al/NiMH batteries. These internal batteries require frequent recharging because a fully charged battery is normally discharged in about an hour of continuous use of the apparatus.

Commonly, battery charger systems that do not contemplate the possibility of using the portable apparatus during recharging of its internal battery have an architecture as shown in FIG. 1.

Typically, the internal battery of the apparatus is recharged at constant current (Icharge) delivered by a suitable power supply. During recharging, two parameters are continuously monitored, namely: the battery voltage and temperature. Temperature is commonly detected by a negative, temperature coefficient resistance (NTC), purposely inserted in the battery pack. By measuring these two parameters it is possible to determine when the battery has reached full charge and automatically stop the charging in order to prevent damages to the battery that may derive from an excessive overcharge.

Under overcharge conditions, the battery voltage tends to drop from a maximum value reached during recharging ($-\Delta V$) and the temperature of the battery pack tends to raise rapidly with a certain gradient ($\Delta T/\Delta t$). Voltage and temperature, are measured by analog-digital converters and the digital information is processed by a supervising microprocessor. When the values of $-\Delta V$ and $\Delta T/\Delta t$ reach a preset level, the microprocessor intervenes on the constant current power supply circuit of the charger for reducing the output current or for arresting it completely.

The availability of a microprocessor further permits, by using an internal timer, to stop the charging process after a set period of time, in order to eliminate risks to the battery in case of malfunctions.

The above described charger system is satisfactory if the internal battery is preventively isolated from its load circuit (for example from the functional circuits of the portable telephone powered by the battery) during recharging. This implies that during the charging period the apparatus is unusable. In view of the fact that the recharging time may be in the order of two hours (depending on the capacity of the internal battery and of the charging current level), the inability of using the telephone or the portable apparatus during such a long period represents a drawback. The availability of a second (reserve) battery pack is a costly and/or unpractical solution.

On the other hand, if the telephone or other portable apparatus is put in operation during recharging, the current absorbed by the functional circuits subtracts from the charging current of the battery provided by the constant current battery charger. Therefore, only a portion of a markedly lower value remain available for continuing the charging of the battery. Thus, the maximum battery charge period, set by the internal timer of the charging system may expire before the battery is completely charged. If the current absorbed by the apparatus is larger than the charging current delivered by the constant current battery charger system, the battery under charge must provide the current difference, thus discharging also during the period of recharging.

Of course, such a drawback may be overcome by employing a known battery charger system, purposely modified, as schematically shown in FIG. 2.

According to this type of battery charger, in order to permit the use of the portable apparatus (e.g. a cellular telephone) during a recharging of its internal battery, without incurring the above-noted problems, the battery charger system may be provided with a dedicated auxiliary power supply circuit, capable of suitably power the apparatus at a voltage slightly higher than the battery voltage during a recharging phase of the internal battery, without jeopardizing the charging process. A fourth connecting wire of the portable apparatus to the battery charger, permits to connect to the supply node A of the functional circuits of the portable apparatus an auxiliary power supply, the output voltage of which (Vsupply) may have a value such as to always be higher than the battery voltage $V_B$.

A decoupling element (for example a diode D) between the battery rail $V_B$ and the supply node A, ensures that the current absorbed by the apparatus (telephone) during a recharging process of its internal battery, be exclusively provided by the dedicated line Vsupply, in view of the fact that the diode D is reverse-biased.

When the apparatus is off, the diode D will not permit to the battery being charged to absorb current from the auxiliary supply line Vsupply, so that, whichever the condition of the apparatus (on or off), the charge current of the battery is always and only the constant current Icharge. Of course, the decoupling element, which in the depicted example is constituted by the diode D, may also be of other type. For example, the decoupling may be realized by mechanical means (for example a microswitch or jack connector) that are automatically acted upon when connecting the portable apparatus to the battery charger.

Therefore, the telephone or apparatus may be safely used also during the recharging of its internal battery.

On the other hand, it is evident that the addition of a dedicated auxiliary power supply circuit in a constant current battery charger system implies an enlargement of the electronic part of the system which is normally realized in integrated form, and an accompanying increase of the costs.

It has now been found and constitutes the subject matter of the present invention an outstandingly economical way of providing an auxiliary power supply output at an appropriate voltage for the functional circuits of the portable apparatus, during a recharging process of its internal battery.

Basically, the system of the invention is capable of deriving an output line at a voltage that is essentially higher than the voltage present across the terminals of the battery being charged, by deriving such an auxiliary supply line before a sensing resistance that is functionally connected in series to the path of the charging current of the battery, that is between an inductor and the output node of a converter circuit of the battery charger. On the other hand, the sensing resistance constitutes the element that provides an information on the current output by the battery charger to a feedback loop that stabilizes the charge current delivered to the battery.

In a constant current battery charger system of the type considered, the loop that regulates the output voltage of the battery charger is normally inactive because, in view of the fact that the load is a battery, the load battery itself fixes the voltage, practically preventing the output voltage of the battery charger from raising to a level such as to activate the voltage regulating loop. In practice, the voltage regulating loop would be activated only if the battery is disconnected from the battery charger terminals, but of course this is an unimportant contingency in the particular context.

BRIEF DESCRIPTION OF THE DRAWING

The disclosed inventions will be described with reference to the accompanying drawings, which show important sample embodiments of the invention and which are incorporated in the specification hereof by reference, wherein.

The different aspects and advantages of the invention will become more evident through the following description of several important embodiments and by referring to the attached drawings, wherein.

DETAILED DESCRIPTION OF THE PREFERRED EMBODIMENTS

Figure 3:
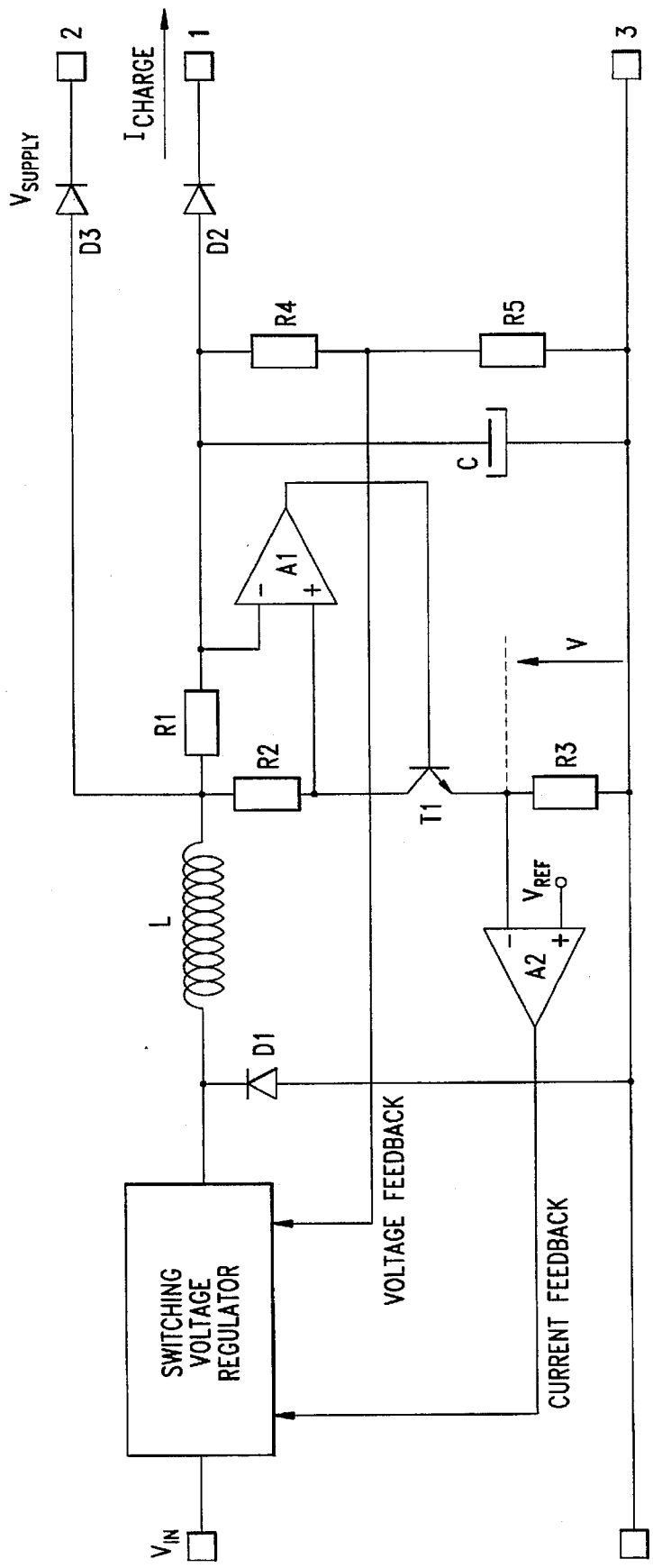
FIG. 3 is a basic diagram of a constant current battery charger and auxiliary power supply for a portable apparatus, according to the present invention.

The numerous innovative teachings of the present application will be described with particular reference to the presently preferred embodiment (by way of example, and not of limitation), in which:

With reference to the diagram of FIG. 3, the constant current battery charger system, capable of simultaneously powering a portable apparatus, according to the present invention, may comprise a common switching mode, voltage regulator circuit, provided with at least a first, voltage regulator input and at least a second, current regulation input. The converter circuit, of a step-down type, may comprise an inductor L, an output capacitor C and a diode D1 for recirculating the discharge current of the inductor L, according to a common configuration of such a circuit. An output diode D2 may be present to avoid the discharge of the battery through the charger circuit in case the system be switched-off.

Voltage regulation, may be implemented by employing an output voltage divider R4–R5 capable of providing an information on the output voltage to the switching-mode, regulating circuit, according to a normal practice.

Stabilization of the charge current that is delivered to the battery, is implemented by employing a current regulating loop comprising at least a sensing resistance R1, function- ally connected in series with the inductor L. The signal present across the sensing resistance R1 is amplified by an amplifier A1, suitable to force, through a gain stage constituted by the transistor T1, a current through the resistance R3. Therefore, the voltage V that develops across the resistance R3 is proportional to the charge current, according to the following relationship:

$$V = \frac{I_{charge} R_1 R_3}{R_2} \quad (1)$$

The voltage difference between the voltage V and a reference $V_{REF}$ is amplified by the comparator A2, the output of which drives a switching-mode regulator circuit so as to verify the condition $V=V_{REF}$, namely $$I_{charge} = V_{ref} \frac{R_2}{R_1 R_3} \quad (2)$$

The feedback control loop of the system is such as to maintain $V=V_{REF}$, that is a predetermined constant charge current (Icharge=constant).

In such a constant-current battery charger system, the voltage between the terminals 1 and 3 will depend on the impedance of the load that is connected to these terminals. If the impedance is extremely small (a short circuit in the limit) the voltage will be very small (null in the limit), but the current will remain constant.

If the impedance of the load is high (an open circuit in the limit), the voltage will be high. When the output voltage becomes higher than a value fixed by the resistive divider R4–R5, a voltage control feedback loop within the switching-mode voltage regulator circuit is activated and automatically limits the output voltage to a pre-established maximum value. Of course, in case of an open circuit, no current is delivered.

As already underlined above, in a battery charger for a portable apparatus, such as for example a cellular telephone, the way in which the battery charger is used, is such as to exclude in practice the possibility for the voltage regulating loop to be activated. In fact, the output voltage regulating loop shall intervene only when the portable apparatus is disconnected from the battery charger.

Figure 1:
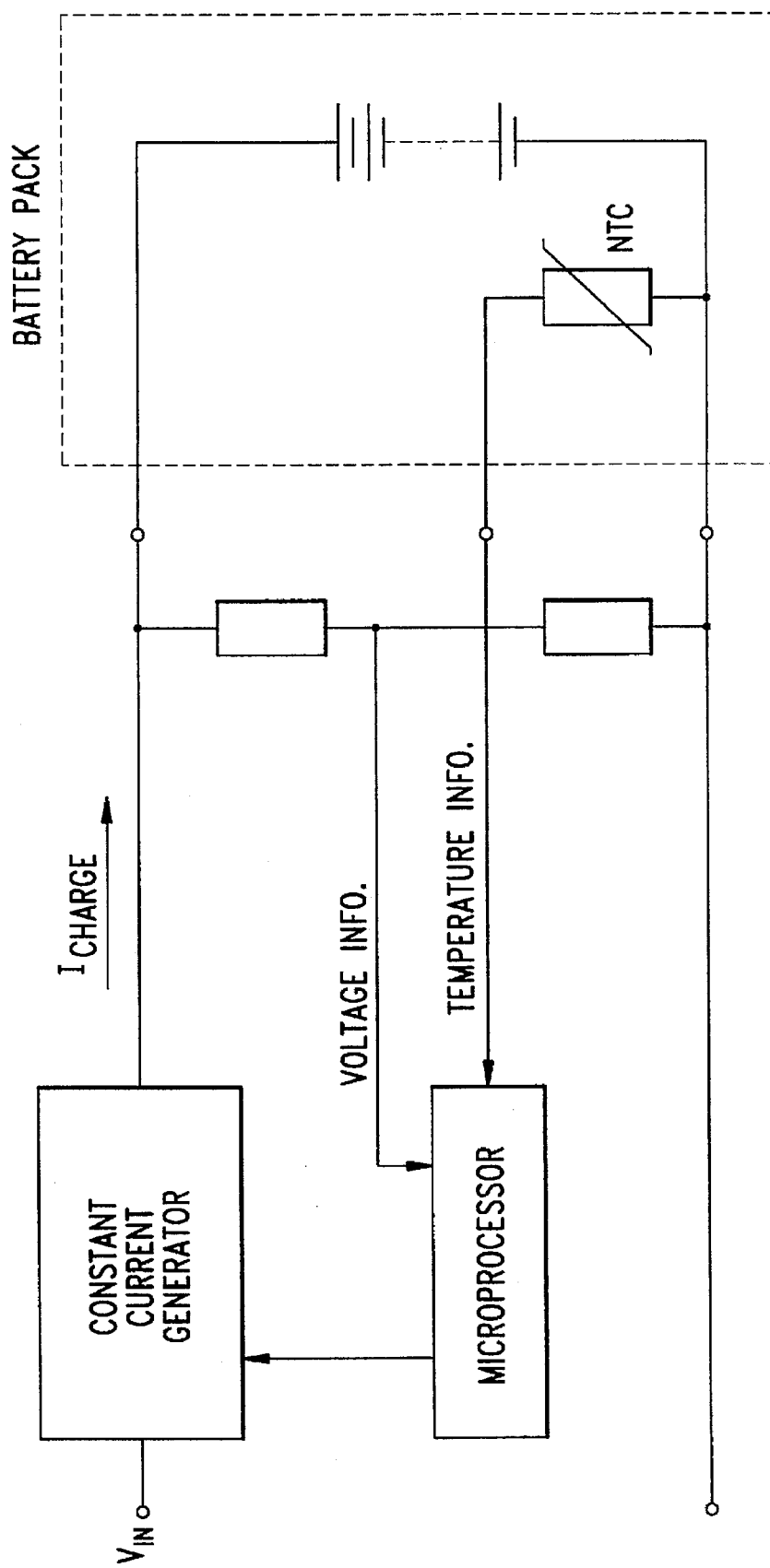
FIG. 1 is a basic diagram of a constant current battery charger according to the prior art, as already described above.
Figure 2:
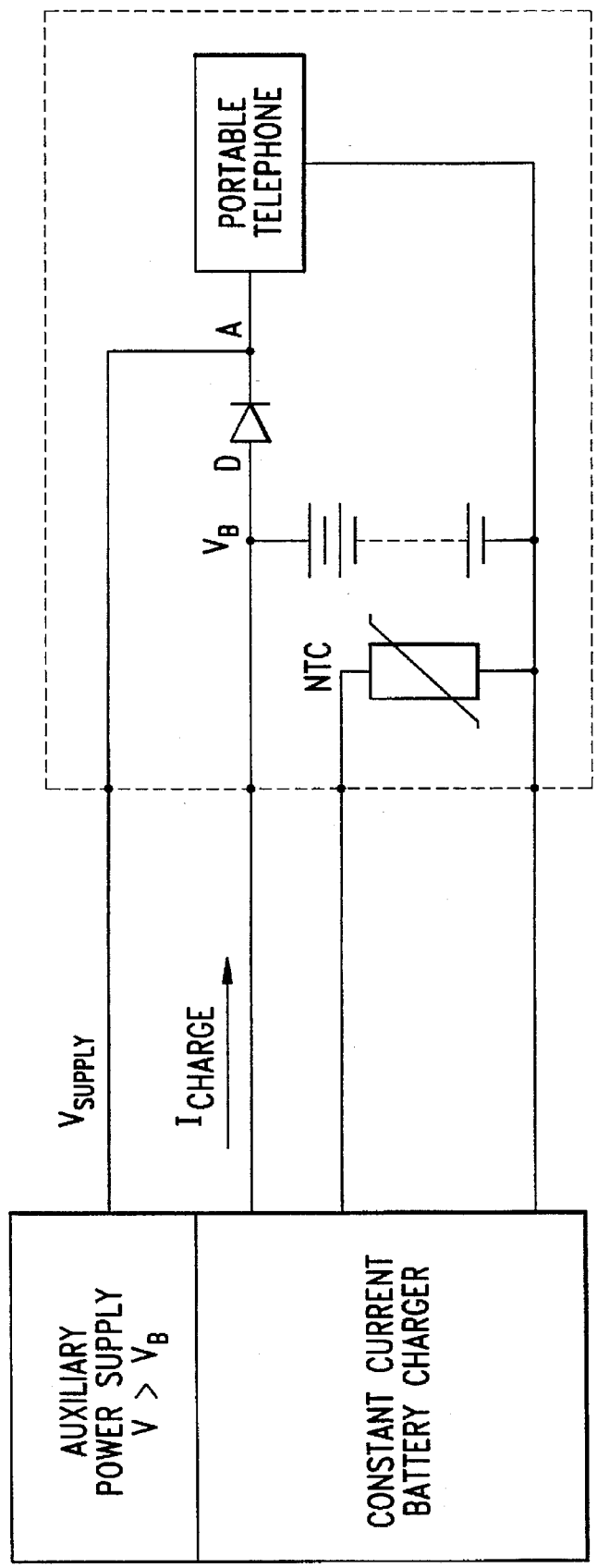
FIG. 2 is a diagram of a constant current battery charger provided with an auxiliary supply output for the functional circuits of the portable apparatus during recharging of the internal battery, according to prior art.

According to the present invention, the function of powering the functional circuits of the portable apparatus, separately from the battery under charge, thus permitting the use of the apparatus also during recharging of its internal battery, is implemented in an extremely simple and economical manner, through an auxiliary power supply line (Vsupply) for the functional circuits of the portable apparatus (node A in FIG. 2), while ensuring that such auxiliary supply voltage (Vsupply) be always, under any condition, greater than the constant current battery charger. This auxiliary power supplying line is connected or derived from a node "up-stream" of the sensing resistance R1 of the battery charger circuit, as depicted in FIG. 3.

A diode D3 may be connected in the auxiliary power supply line for preventing discharge of the battery of the portable apparatus through the battery charger circuit in case the latter is switched-off. Of course, in case the portable apparatus is provided with a mechanical decoupling element (switch) between the battery and the supply node of the functional circuits of the apparatus during recharging, the diode D3 is no longer necessary.

As it may be observed, the current that is eventually absorbed by the functional circuits of the portable apparatus when switched-on during a recharging phase of its internal battery, is provided by the switching-mode power supply circuit and such a current does not flow through the sensing resistance R1. Therefore, this does not affect in any way, the current regulation loop of the constant current delivered by the charger to the battery, which will continue to be stabilized at the value set by the following relationship:

$$I_{charge} = V_{REF} \frac{R_2}{R_1 R_3} \quad (3)$$

On the other hand, if $V_B$ is the battery voltage that is connected across the terminals 1 and 3 of the battery charger, the voltage between the terminals 2 and 3 is given by:

$$V_{supply} = V_B + V_{D2} + I_{charge} R_1 - V_{D3} \quad (4)$$

where $V_{D2}$ and $V_{D3}$ are the voltage drops on the diodes D2 and D3, respectively. In practice, because $V_{D2} = V_{D3}$, the equation (4) shows that the voltage Vsupply is always higher than the battery voltage $V_B$ and therefore, referring to the diagram of FIG. 2, no current may be absorbed by the battery being charged through the auxiliary Vsupply line.

The auxiliary supply voltage Vsupply thus derived, optionally through the diode D3, will not be a constant voltage but a voltage that is proportional and always higher than the battery voltage $V_B$ that is connected to the terminals 1 and 3 of the battery charger. Only if the battery is disconnected from the battery charger, the voltage $V_{supply}$ becomes a constant voltage the value of which is set by the voltage regulating loop of the battery charger, less the voltage drop across the diode D3.

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

In an alternate embodiment, the control loop incorporating amplifier A1 could be configured in many ways, as long as it senses a voltage downstream of the sensing resistor R1.

In another alternate embodiment, the invention could be applied with both boost converter and buck converter configurations.

In another alternate embodiment, the invention could be applied (with appropriate adjustments) almost regardless of the relation between Vin and Vb?

In another alternate embodiment, the invention could less preferably be implemented with RC filter stages rather than the inductive stage shown.

In another alternate embodiment, the innovative battery charger circuit does not have to provide strictly constant current in the long run, i.e. the invention could be used with control strategies which gradually taper off the charging current as the battery approaches full charge.

What is claimed is:

1. A battery charger circuit, comprising:
   a switching-mode voltage regulator circuit, configured to provide a chopped output which is regulated in accordance with a current feedback input thereto;
   inductive filtering circuitry electrically interposed between said voltage regulator circuit and a battery output terminal, to pass a charging current between said voltage regulator circuit and a battery;
   a series resistor interposed between said voltage regulator circuit and said battery to pass said charging current;
   an auxiliary power output connected to provide an output of current drawn from said voltage regulator circuit, which has been filtered by said filtering circuitry but which has not passed through said series resistor, said auxiliary power output providing power to a portable apparatus, said portable apparatus having decoupling means between said auxiliary power output and said battery during recharging of said battery;
   wherein said current feedback input of said voltage regulator circuit is operatively connected to detect the voltage across said series resistor;
   whereby said charging current can remain substantially constant, while said auxiliary power output always provides a higher voltage than the voltage provided at said battery output terminal, regardless of load conditions.

2. A circuit as defined in claim 1, wherein said decoupling means are a diode functionally connected between a pole of said battery and a supply node of said portable apparatus.

3. A circuit as defined in claim 1, wherein said decoupling means is a mechanical switch capable of interrupting the current path between a terminal of said battery and a power supply node of said portable apparatus when said battery is being charged.

4. A circuit as defined in claim 1, wherein said portable apparatus is a telephone.

5. A circuit as defined in claim 1, wherein said portable apparatus is a computer.

6. A method for charging portable battery-powered equipment, comprising the steps of:
   (a.) providing a charging current from a switched-mode power supply to battery connections, while passing said charging current through a sensing resistor;
   (b.) feeding back the voltage on said sensing resistor to control said power supply to achieve a substantially constant charging current;
   (c.) tapping off additional current, which is not passed through said sensing resistor, to provide operating current to the portable battery-powered equipment at an auxiliary power output terminal; and
   (d.) decoupling said portable battery-powered equipment from said battery with decoupling means when said charging current is being provided to said battery connections, the decoupling means being located between said auxiliary power output terminal and said battery connections.

7. The method of claim 6, wherein said portable battery-powered equipment is a telephone.

8. The method of claim 6, wherein said portable battery-powered equipment is a computer.

9. A constant current battery charger, capable of separately powering a portable apparatus, comprising
   a switching-mode voltage regulator circuit,
   a converter circuit comprising an inductor, a capacitor, a recirculation diode, an output voltage control loop, and a current stabilization loop for stabilizing the charge current comprising at least a sensing resistance connected in series between said inductor and an output node of said converter circuit, said inductor, capacitor, and diode being connected in series, said loops being connected to said voltage regulator circuit; and
   an auxiliary power supply output line for powering said portable apparatus during recharge of an internal battery thereof, comprising a line connected to an interconnection node between said sensing resistance and said inductor.

10. A system as defined in claim 9, wherein said portable apparatus is provided with decoupling means between functional circuits of the apparatus and said internal battery, during recharging of said battery.

11. A system as defined in claim 10, wherein said decoupling means are a diode functionally connected between a pole of said internal battery of the apparatus and a supply node of said functional circuits.

12. A system as defined in claim 11, wherein said auxiliary power supply line comprises a decoupling diode.

13. A system as defined in claim 10, wherein said decoupling means is a mechanical switch capable of interrupting the current path between a terminal of said battery and a power supply node of said functional circuits when said battery is being charged.

14. A circuit as defined in claim 9, wherein said portable apparatus is a telephone.

15. A circuit as defined in claim 9, wherein said portable apparatus is a computer.

* * * * *